W. O. FELT.
PROCESS OF SEPARATING HYDROCARBONS FROM NATURAL OR OTHER GAS.
APPLICATION FILED OCT. 3, 1908.
1,213,795.     Patented Jan. 23, 1917.
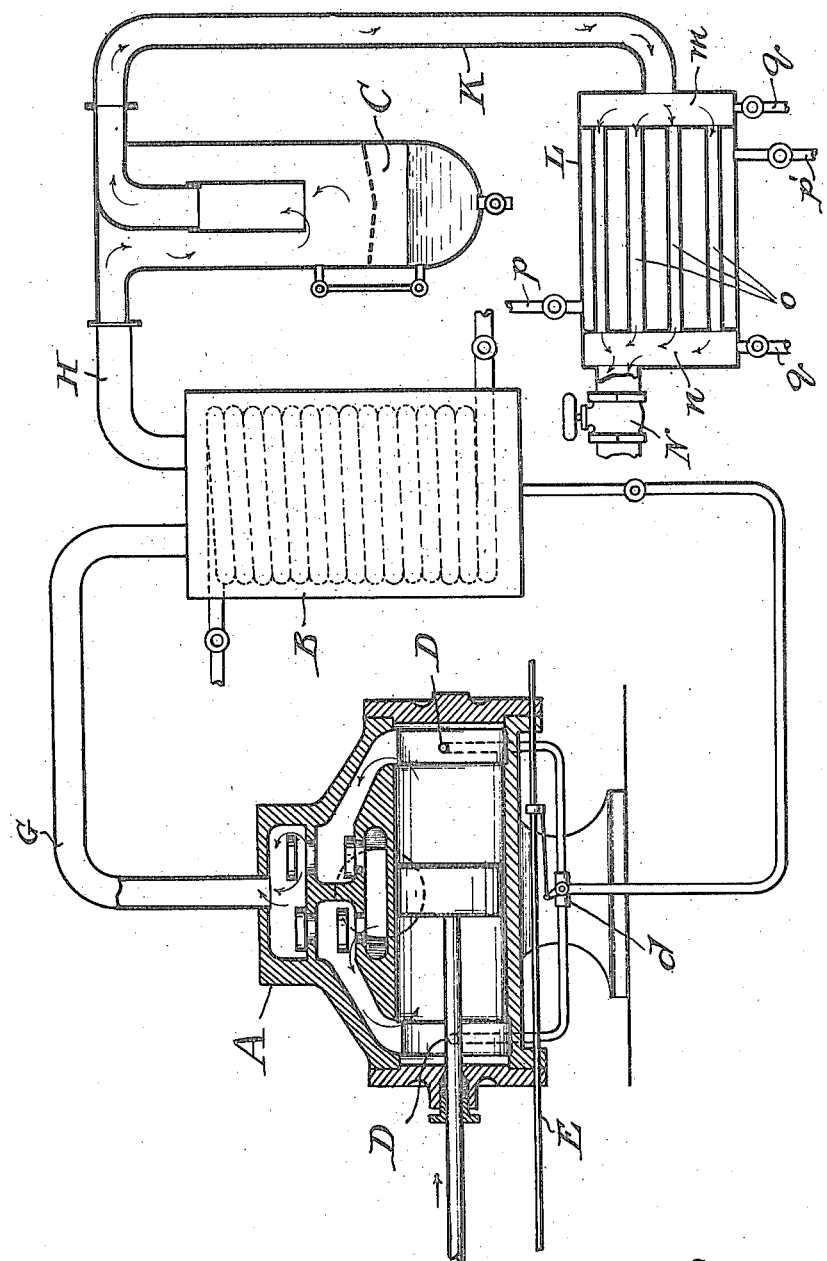
Inventor
Willard Oliver Felt.
By His Attorney
Jas. H. Griffin

UNITED STATES PATENT OFFICE.

WILLARD OLIVER FELT, OF BRADFORD, PENNSYLVANIA, ASSIGNOR TO PETROLEUM PRODUCTS COMPANY, A CORPORATION OF NEW JERSEY.

PROCESS OF SEPARATING HYDROCARBONS FROM NATURAL OR OTHER GAS.

1,213,795.

Specification of Letters Patent.

Patented Jan. 23, 1917.

Application filed October 3, 1908. Serial No. 456,069.

*To all whom it may concern:*

Be it known that I, WILLARD OLIVER FELT, a citizen of the United States, residing in Bradford, county of McKean, and State of Pennsylvania, have invented a certain new and useful Process of Separating Hydrocarbons from Natural or other Gas, of which the following is a specification.

The object of the invention is to obtain from natural gas, oil gas, or other gas, all the condensable hydrocarbons therein by compressing the gas in the presence of an agent which precludes any material elevation in the temperature of the gas as a result of the so-called heat of compression, and subsequently liquefying the hydrocarbons contained in the gas by cooling or refrigeration. This result is accomplished by injecting into the gas to be compressed, preferably at the time of compression, a suitable heat-absorbing agent, and I have found gylcerin particularly well adapted for this purpose. The glycerin is preferably injected into the compression cylinder, at each compressing operation, in the form of a very fine vapor, mist or spray. When glycerin is employed, its effect is not only to preclude the elevation of the temperature of the gas, as described, but it acts also to simultaneously purify the condensable hydrocarbon vapors and residual gas, due to its property of absorbing the tarry and other impurities contained in the vapors and gas.

So far as understood, the success of my process, particularly when glycerin is employed, is attributable to three causes:— first, to the heat-absorbing power of glycerin due to its specific heat; second, to the hygroscopic power or avidity of the glycerin for the aqueous vapor contained in the gas, and, third, to the lubricating action of the glycerin on the molecules of the gases, whereby they are compressed with less work than would ordinarily be required, and the heat of compression incidentally reduced to a minimum.

As a result of compressing the gas, without material rise in temperature, the cracking of the condensable hydrocarbons is prevented, thereby resulting in a much larger yield of these bodies than can be obtained when glycerin is not employed.

The accompanying drawings show, partly in elevation and partly in section, one type of apparatus which I have employed in practising my invention, but it will be understood that the process can be carried out in various forms of apparatus.

Referring to the drawings, A is a compression cylinder driven in the usual way by power not shown, in which the gas may be compressed up to preferably 150 pounds to 300 pounds per square inch.

B is the supply tank, under pressure, containing Turkey-red oil under pressure, or glycerin under pressure, to which is piped the compressed gas above the liquid, and from which the oil is piped to the compression cylinder, and it is provided with a cooling coil $b$.

C is a separator, of any form, in which by means of baffle plates, for example, or staggered plates, or centrifugal force or otherwise, the oil is separated from the compressed gas.

D and D are injection nozzles for the injection of the oil or glycerin in the compression cylinder, said valves being controlled by a three-way cock $d$ operated by an eccentric rod E adjusted to open on the compression side of the stroke, each valve opening as soon as the piston begins to compress, and remaining open during compression or some part of it.

G is a pipe connection between the compressed gas main and the supply tank, maintaining a constant pressure of the gas above the surface of the oil to force the oil or glycerin into the cylinder, which pressure is always greater than that in the cylinder at any point of the compression stroke, except at the end of the stroke.

H is a pipe leading from tank B to the separator, through which is conveyed the gas and the oil or glycerin.

I is an off-take pipe from separator C, connecting with a pipe K, which leads to any suitable condenser L, in this instance shown as having heads $m$, $n$, connected by tubes $o$, through which the gases pass. Any suitable cooling agent is supplied through pipe $p$, into the casing of the condenser and passes out through pipe $p'$. As a result of this cooling operation, part or all of the condensable hydrocarbons are liquefied and can be drawn off through pipes $q$, $q'$, the non-condensable gases passing off from the condenser through the valved pipe N, which gases may be further cooled, if desired.

For simplicity, I have shown this illustration in diagrammatic form, without encumbering the drawing with the inlet air ports for the gas to be compressed, the outlet valves, the stop-cocks and other details, all of which are well-known to those conversant with the art, and all of which may be varied according to the preference of those working the process.

The operation of the apparatus and the working of the process will be understood from the foregoing description, wherein natural gas, as an example, is treated for the purpose of extracting the gasolene or other condensable hydrocarbons therefrom, but, concurrently with this extraction the gas may be purified and dried for purposes which concern the use of the gas, but which will not be described in this application, because the present process is confined to the extraction of gasolene or other condensable hydrocarbons.

I charge the supply tank B with Turkey-red oil or with glycerin, from which through the injection nozzles D and D it is injected in a spray controlled by the three-way cock $d$ alternately first to one end, then to the other end of the compression cylinder, each valve opening as soon as the piston begins to compress and remaining open during compression or some part of it. I employ this Turkey-red oil or glycerin at this stage, for the purpose of compressing the gas without heating it, for I have discovered that these agents will extract or preclude the heat of compression from the gas as it is compressed, and I thus dispense with water-jackets and inter-coolers and multiple stage compressors, and avoid the destruction of the light hydrocarbons some of which when condensed out as hereinafter stated become the low gravity gasolene. The pressure communicated from the pressure main through the pipe G to the gas above the surface of the Turkey-red oil or glycerin in the supply tank B furnishes the means for injecting a small quantity of the oil or glycerin into the compression side of the compression cylinder at each stroke. Before the end of the compression stroke, and about the time the pressure in the cylinder equals the pressure in the supply tank, the injection nozzle for the Turkey-red oil or glycerin is closed by the three-way cock $d$ operated by an eccentric on the main shaft, not shown, of the driving engine or otherwise. The compressed gas, intimately commingled with the oil or glycerin associated with the aqueous vapor and the impurities, is led to the top of the separating tank, whereby passing over the baffle plates, if the separator is of that construction, the oil associated vapor and impurities, warmed by the heat of compression, drips down to the bottom. The purified, cooled and compressed gas passes on to the condenser L, where the gasolene or other hydrocarbon is liquefied and separated.

I have discovered that by cooling the compressed gas, and I prefer temperatures ranging from zero to 32° Fahrenheit, the condensable hydrocarbons are separated in quantity ranging from one gallon to five gallons, depending on the specific gravity of the gas, for each 1,000 cubic feet of gas treated.

I may treat natural gas under its natural pressure, if that pressure is sufficient, by passing the gas through a body of glycerin, or by spraying into a receptacle through which the natural gas passes a spray of glycerin, so that the gas may be intimately commingled with the glycerin, whence the gas passes to the cooling condenser L, where its temperature is reduced below that of atmospheric temperature; and I thus get from natural gas when under sufficient pressure the condensable hydrocarbons of a quality and quantity which would not result by ordinary compression.

I may vary the form of the apparatus widely without departing from the spirit of my invention, and I may apply the process to oil gas, which is made by destructive distillation of crude oil or its distillates. The salient feature of my invention consists in the separation of condensable hydrocarbons from natural, or other gas containing them, by the process described, and without introducing therein the impurities or aqueous vapors contained in the original gas, thereby precluding the necessity of subsequently removing said impurities.

The particulars given are by way of illustration only, and not as a limitation.

Having now described my invention, what I claim as new and desire to secure by Letters Patent is—

1. In the art of separating condensable hydrocarbons from gases containing them, the process which consists in compressing the gas in the presence of a heat-absorbing agent.

2. The process of separating condensable hydrocarbons from gases containing them, which consists in compressing the gas in the presence of a heat-absorbing agent, and then cooling the compressed gas, whereby the condensable hydrocarbons are liquefied.

3. The process of separating condensable hydrocarbons from gases containing them, which consists in compressing the gas in the presence of a heat-absorbing agent, cooling the compressed gas, whereby the condensable hydrocarbons are liquefied, and then separating the condensed hydrocarbons from the gas.

4. In the art of separating condensable hydrocarbons from gases containing them, the process which consists in compressing the gas in the presence of glycerin.

5. The process of separating condensable hydrocarbons from gases containing them, which consists in compressing the gas in the presence of glycerin, and then cooling the compressed gas, whereby the condensable hydrocarbons are liquefied.

6. The process of separating condensable hydrocarbons from gases containing them, which consists in compressing the gas in the presence of glycerin, cooling the compressed gas, whereby the condensable hydrocarbons are liquefied, and then separating the condensed hydrocarbons from the gas.

7. In the art of separating condensable hydrocarbons from gases containing them, the process which consists in compressing the gas in the presence of a heat-absorbing and purifying agent.

8. The process of recovering condensable hydrocarbons from gas, which consists in compressing the gas in the presence of a liquid agent, reducing the temperature of the mixed gas and condensable hydrocarbons to a point at which said hydrocarbons liquefy, and then separating the liquefied hydrocarbons.

9. The process of separating condensable hydrocarbons from gases containing them, which consists in compressing the gas in the presence of a non-aqueous heat-absorbing agent, then cooling the mixture so as to condense the hydrocarbons, and then separating the hydrocarbons from the gas.

10. The process of separating condensable hydrocarbons from gases containing them, which consists in compressing the gas in the presence of a heat-absorbing and purifying agent whereby the gas is simultaneously compressed and purified, then refrigerating the mixture so as to liquefy the condensable hydrocarbons, and separating said hydrocarbons.

11. The process of separating condensable hydrocarbons from gases containing them, which consists in compressing the gas in the presence of a heat absorbing agent which simultaneously purifies the liquefiable hydrocarbons during the compressing operation, cooling the resulting mixture so as to liquefy the condensable hydrocarbons therein, and then separating said hydrocarbons.

12. The process of treating hydrocarbon gases containing condensable hydrocarbons which consists in compressing the gas in the presence of a heat absorbing and purifying agent commingled with the mass of gas, separating the heat absorbing agent and its entrained impurities from the body of the gas, cooling the resulting mass of gas so as to liquefy the condensable hydrocarbons therein, and then separating said hydrocarbons.

13. The process of treating hydrocarbon gases containing condensable hydrocarbons which consists in taking the gas while under pressure and commingled with a cooling and purifying agent distributed throughout the mass of the gas, cooling the mixture of gas and purifying agent to such degree as will liquefy the purifying agent without condensing the liquefiable hydrocarbons, separating said purifying agent with its entrained impurities from the body of the gas, refrigerating the gas to condense the liquefiable hydrocarbons therein, and then separating said hydrocarbons from the gas.

In testimony whereof, I have hereunto set my hand at the city, county and State of New York, this 29th day of September, 1908.

WILLARD OLIVER FELT.

In presence of—
F. M. JOHNSTON,
G. DOUGLAS FELT.